(12) United States Patent
Sugaya et al.

(10) Patent No.: US 10,711,673 B2
(45) Date of Patent: Jul. 14, 2020

(54) EXHAUST PURIFICATION SYSTEM AND CONTROL METHOD

(71) Applicant: ISUZU MOTORS LIMITED, Shinagawa-ku, Tokyo (JP)

(72) Inventors: Yuuki Sugaya, Ayase (JP); Takayuki Koike, Yamato (JP); Kenta Shioyasu, Yokohama (JP)

(73) Assignee: ISUZU MOTORS LIMITED, Shinagawa-Ku, Tokyo (JP)

(*) Notice: Subject to any disclaimer, the term of this patent is extended or adjusted under 35 U.S.C. 154(b) by 68 days.

(21) Appl. No.: 16/082,900

(22) PCT Filed: Mar. 6, 2017

(86) PCT No.: PCT/JP2017/008679
§ 371 (c)(1),
(2) Date: Sep. 6, 2018

(87) PCT Pub. No.: WO2017/154812
PCT Pub. Date: Sep. 14, 2017

(65) Prior Publication Data
US 2019/0101035 A1    Apr. 4, 2019

(30) Foreign Application Priority Data
Mar. 7, 2016   (JP) ................. 2016-043220

(51) Int. Cl.
*F01N 3/08* (2006.01)
*F01N 3/20* (2006.01)
(Continued)

(52) U.S. Cl.
CPC .......... *F01N 3/2006* (2013.01); *B01D 53/94* (2013.01); *F01N 3/08* (2013.01); *F01N 3/20* (2013.01);
(Continued)

(58) Field of Classification Search
CPC ... B01D 53/94; F01N 3/08; F01N 3/20; F01N 3/2006; F01N 3/2033; F01N 3/2066;
(Continued)

(56) References Cited

U.S. PATENT DOCUMENTS

| | | |
|---|---|---|
| 5,928,303 A | 7/1999 | Sakai |
| 2004/0000136 A1 | 1/2004 | Miura |
| 2005/0204727 A1 | 9/2005 | Lewis et al. |
| 2007/0163242 A1 | 7/2007 | Matsuoka et al. |

(Continued)

FOREIGN PATENT DOCUMENTS

| | | |
|---|---|---|
| CN | 1715620 A | 1/2006 |
| CN | 1930390 A | 3/2007 |

(Continued)

OTHER PUBLICATIONS

International Search Report and Written Opinion for related International Application No. PCT/JP20171008679, dated Apr. 11, 2017; 8 pages; English translation of ISR provided.
(Continued)

*Primary Examiner* — Audrey K Bradley
(74) *Attorney, Agent, or Firm* — Procopio, Cory, Hargreaves & Savitch LLP

(57) ABSTRACT

An exhaust purification system includes: a fuel injection amount acquisition unit, which acquires a fuel injection amount of a vehicle; a temperature acquisition unit which acquires a temperature of a catalyst for reducing and purifying nitrogen compounds in exhaust; a temperature control unit, which controls the temperature of the catalyst; and an execution control unit, which causes the temperature control unit to increase the temperature of the catalyst when the temperature of the catalyst is lower than a predetermined threshold and the fuel injection amount satisfies a predetermined condition.

4 Claims, 2 Drawing Sheets

(51) Int. Cl.
*F02D 41/02* (2006.01)
*F02D 41/04* (2006.01)
*B01D 53/94* (2006.01)
*F02D 41/14* (2006.01)
*F02D 41/40* (2006.01)
*F02D 41/00* (2006.01)

(52) U.S. Cl.
CPC ......... *F01N 3/2033* (2013.01); *F01N 3/2066* (2013.01); *F02D 41/0245* (2013.01); *F02D 41/1446* (2013.01); *F01N 2430/06* (2013.01); *F01N 2560/06* (2013.01); *F01N 2610/02* (2013.01); *F01N 2610/03* (2013.01); *F01N 2900/08* (2013.01); *F01N 2900/10* (2013.01); *F01N 2900/1602* (2013.01); *F02D 41/0002* (2013.01); *F02D 41/023* (2013.01); *F02D 41/04* (2013.01); *F02D 41/405* (2013.01); *F02D 2200/0614* (2013.01); *F02D 2200/0802* (2013.01); *F02D 2200/101* (2013.01); *F02D 2200/1002* (2013.01); *F02D 2200/501* (2013.01); *Y02A 50/2322* (2018.01)

(58) Field of Classification Search
CPC ............. F01N 2430/06; F01N 2560/06; F01N 2610/02; F01N 2610/03; F01N 2900/08; F01N 2900/10; F01N 2900/1602; F02D 41/002; F02D 41/023; F02D 41/0245; F02D 41/04; F02D 41/1446; F02D 41/405; F02D 2200/501; F02D 2200/0614; F02D 2200/0802; F02D 2200/1002; F02D 2200/101; Y02A 50/2322
See application file for complete search history.

(56) References Cited

U.S. PATENT DOCUMENTS

| | | |
|---|---|---|
| 2008/0210208 A1 | 9/2008 | Tateno |
| 2011/0277449 A1 | 11/2011 | Gonze et al. |
| 2014/0251268 A1 | 9/2014 | Yamada et al. |
| 2015/0354170 A1 | 12/2015 | Ishihara et al. |

FOREIGN PATENT DOCUMENTS

| | | |
|---|---|---|
| CN | 102242659 A | 11/2011 |
| DE | 19844745 C1 | 12/1999 |
| EP | 1108875 A1 | 6/2001 |
| EP | 1424482 A2 | 6/2004 |
| EP | 1467079 A2 | 10/2004 |
| EP | 2116698 A1 | 11/2009 |
| EP | 2927448 A1 | 10/2015 |
| JP | H06-213056 A | 8/1994 |
| JP | H10-141122 A | 5/1998 |
| JP | 2004-068690 A | 3/2004 |
| JP | 2004-150299 A | 5/2004 |
| JP | 2005-256819 A | 9/2005 |
| JP | 20060161629 A | 6/2006 |
| JP | 2007-077820 A | 3/2007 |
| JP | 2007-291970 A | 11/2007 |
| JP | 2008-144707 A | 6/2008 |
| JP | 2013-104415 A | 5/2013 |
| JP | 2015-232246 A | 12/2015 |
| WO | 2015150451 A1 | 10/2015 |

OTHER PUBLICATIONS

Extended European Search Report for related EP App No. 177631510 dated Feb. 20, 2019, 8 pgs.
Office Action for related CN App. No. 201780015807.4 dated Feb. 3, 2020; English translation provided. 15 pages.
Notice of Reasons for Refusal for related JP App No. JP 2016-073220, dated Nov. 26, 2019, 6 pgs.

EXHAUST PURIFICATION SYSTEM AND CONTROL METHOD

CROSS-REFERENCE TO RELATED APPLICATIONS

This application is a U.S. National Stage entry of PCT Application No: PCT/JP2017/008679 filed on Mar. 6, 2017, which claims priority to Japanese Patent Application No. 2016-043220, filed Mar. 7, 2016, the contents of which are incorporated herein by reference.

TECHNICAL FIELD

This disclosure relates to an exhaust purification system and a control method of the exhaust purification system for purifying exhaust gas.

BACKGROUND ART

Conventionally, there has been known an exhaust purification system which purifies particulate matter contained in exhaust from an internal combustion engine using a catalyst. Patent Literature 1 discloses a technique of increasing the temperature of the catalyst by increasing a fuel injection amount when the temperature of the catalyst is low in order to activate the catalyst in the exhaust purification system.

CITATION LIST

Patent Literature

[Patent Literature 1]: JP-A-2013-104415

SUMMARY

Technical Problem

By increasing the temperature of the catalyst, an ability to remove the particulate matter contained in the exhaust is improved. However, when the fuel injection amount is changed in order to increase the temperature of the catalyst, since an acceleration feeling is changed due to a change in a driving torque of a vehicle and abnormal noise is generated, a problem of a decrease in drivability (ease of driving) is generated.

This disclosure provides an exhaust purification system and a control method which can suppress a decrease in drivability when an exhaust purification system is transited to a temperature rise mode.

Solution to Problem

The exhaust purification system according to a first aspect of this disclosure includes: a fuel injection amount acquisition unit, which acquires a fuel injection amount of a vehicle; a temperature acquisition unit, which acquires a temperature of a catalyst for reducing and purifying nitrogen compounds in exhaust; a temperature control unit, which controls the temperature of the catalyst; and an execution control unit, which causes the temperature control unit to increase the temperature of the catalyst when the temperature of the catalyst is lower than a predetermined threshold and the fuel injection amount satisfies a predetermined condition.

The execution control unit may determine whether or not to cause the temperature control unit to increase the temperature of the catalyst by comparing the fuel injection amount with a threshold determined based on a rotational speed of an engine.

The execution control unit may cause the temperature control unit to increase the temperature of the catalyst on condition that the fuel injection amount is equal to or greater than a first threshold determined based on a magnitude of fluctuation of a driving torque of the vehicle according to the increment of a temperature of the catalyst.

The execution control unit causes the temperature control unit to increase the temperature of the catalyst on condition that a change amount of the fuel injection amount within a predetermined time is equal to or greater than a second threshold determined based on the magnitude of fluctuation of the driving torque of the vehicle according to the increment of the temperature of the catalyst.

Further, the execution control unit causes the temperature control unit to increase the temperature of the catalyst on condition that the fuel injection amount indicates that the vehicle is in a stop state.

The control method according to a second aspect of this disclosure includes a step of acquiring a fuel injection amount of a vehicle; a step of acquiring the temperature of a catalyst which reduces and purifies nitrogen compounds in exhaust; and a step of increasing the temperature of the catalyst when the temperature of the catalyst is lower than a predetermined threshold and the fuel injection amount satisfies a predetermined condition.

Advantageous Effects of the Invention

This disclosure has an effect that the decrease in the drivability can be suppressed when the exhaust purification system is transited to the temperature rise mode.

DESCRIPTION OF EMBODIMENTS

Summary of Exhaust Purification System 1

Figure 1:
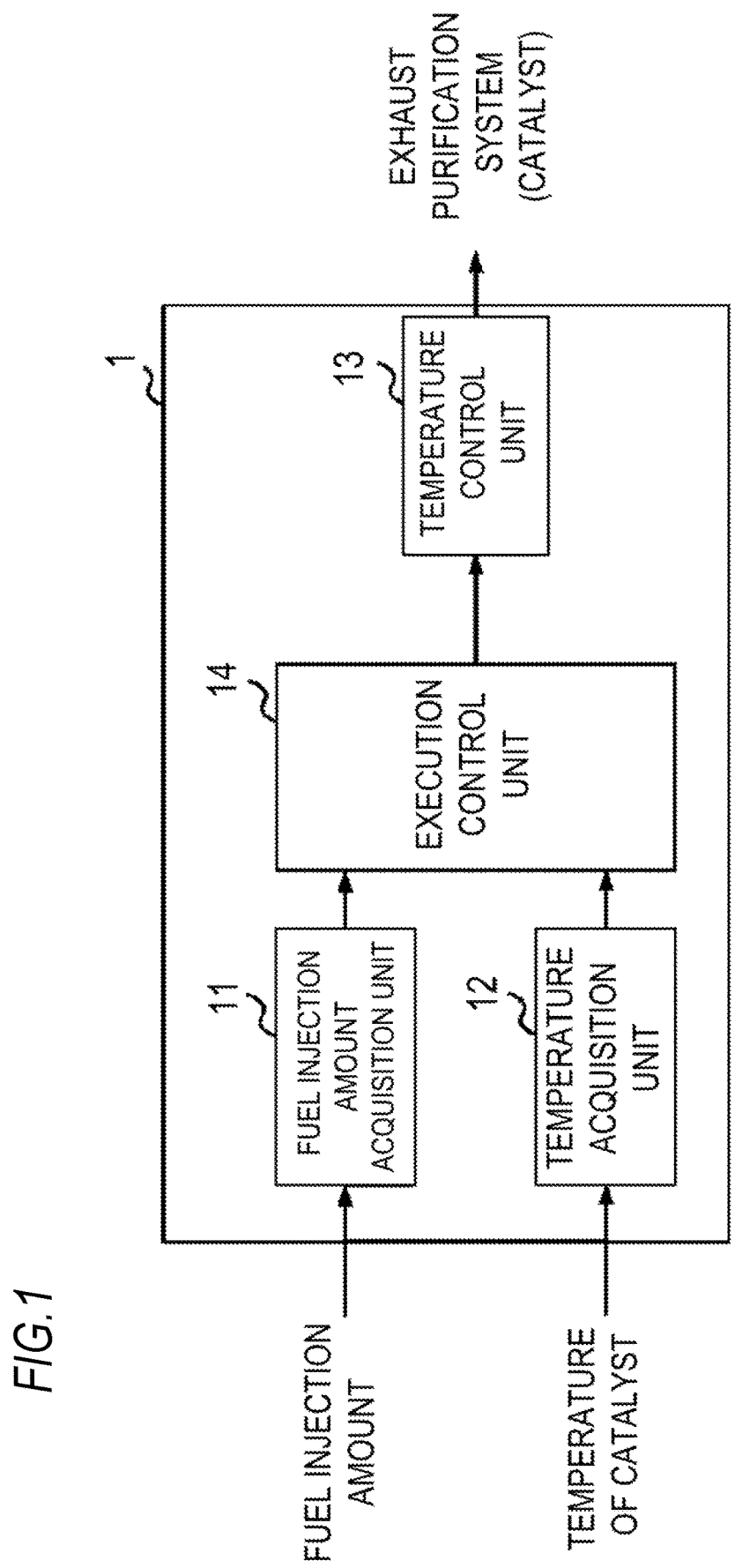
FIG. 1 is a diagram showing a configuration of an exhaust purification system according to the present embodiment.

FIG. 1 is a diagram showing a configuration of an exhaust purification system 1 according to the present embodiment. The exhaust purification system 1 is mounted on a vehicle and uses a catalyst to remove particulate matter contained in exhaust from a diesel engine. The catalyst is, for example, a Selective Catalytic Reduction (SCR) catalyst which selectively reduces and purifies nitrogen compounds in the exhaust using ammonia generated by hydrolyzing urea water as a reducing agent.

In order to activate the catalyst, it is necessary to increase the temperature of the catalyst to a predetermined temperature (for example, 250 degrees Celsius or higher). However, when the exhaust purification system 1 is transited to a mode in which the temperature of the catalyst increases (hereinafter, referred to as a temperature rise mode), by increasing the temperature of the catalyst through throttling intake air or increasing an after injection amount, a driving torque of the vehicle fluctuates and an acceleration feeling changes, so that drivability decreases.

However, depending on a traveling state of the vehicle, even if the driving torque fluctuates, a driver may not notice the fluctuation of the driving torque, and the drivability may not decrease. Therefore, the exhaust purification system 1 is transited to the temperature rise mode and increases the temperature of the catalyst on condition that the fuel injection amount has a magnitude corresponding to a traveling state where the influence of the driving torque on the drivability is small.

Configuration of Exhaust Purification System 1

Hereinafter, the exhaust purification system 1 will be described in detail with reference to FIG. 1.

The exhaust purification system 1 includes a fuel injection amount acquisition unit 11, a temperature acquisition unit 12, a temperature control unit 13, and an execution control unit 14. An exhaust purification program may be executed by a Central Processing Unit (CPU) to function as the exhaust purification system 1 including the fuel injection amount acquisition unit 11, the temperature acquisition unit 12, the temperature control unit 13, and the execution control unit 14.

The fuel injection amount acquisition unit 11 acquires the fuel injection amount from, for example, a fuel injection amount detection unit (not shown). The fuel injection amount acquisition unit 11 notifies the execution control unit 14 of the acquired fuel injection amount. The fuel injection amount acquisition unit 11 may acquire the fuel injection amount by calculating the fuel injection amount based on an accelerator opening degree.

The temperature acquisition unit 12 acquires the temperature of the catalyst. The method of acquiring the temperature of the catalyst by the temperature acquiring unit 12 is arbitrary, and the temperature acquiring unit 12 acquires, for example, the temperature of the catalyst specified based on a signal obtained from a temperature sensor provided in an exhaust system of the exhaust purification system 1. The temperature acquisition unit 12 notifies the execution control unit 14 of the specified temperature of the catalyst.

The temperature control unit 13 controls the temperature of the catalyst by controlling an intake amount or an exhaust mount passing through the catalyst (hereinafter referred to as "intake-exhaust control") or by increasing the after injection amount. Upon transition to the temperature rise mode, the temperature control unit 13 increases the exhaust temperature by controlling the intake amount or the exhaust amount by using an intra-exhaust pipe injection, a post injection, an intake throttle using an intake throttle, or the like so as to increase the temperature of the catalyst.

The temperature control unit 13 performs the intake-exhaust control and increases the after injection amount, and thus the driving torque of the vehicle fluctuates. For example, as the intake amount is narrowed down, the amount of working air in a cylinder decreases, and thus pumping loss increases and the driving torque decreases. In order to suppress a decrease in the drivability according to such fluctuation of the driving torque, the temperature control unit 13 is transited to the temperature rise mode at a timing permitted by the execution control unit 14.

When the temperature of the catalyst and the fuel injection amount satisfy a predetermined condition, the execution control unit 14 transits the temperature control unit 13 to the temperature rise mode. The execution control unit 14 sets a first condition in which the temperature of the catalyst is lower than a predetermined threshold corresponding to the temperature at which the catalyst is not activated. Further, the execution control unit 14 set a second condition in which the fuel injection amount becomes an amount corresponding to a state where it is assumed that the influence of the fluctuation of the driving torque of the vehicle caused by increasing the temperature of the catalyst by the temperature control unit 13 on the drivability of the driver of the vehicle is sufficiently small.

The influence of the torque fluctuation on the drivability varies depending on a traveling state of the vehicle. For example, if the vehicle is traveling in a state where a certain amount of load is applied on the engine, an influence on the drivability is considered to be small even if the temperature control unit 13 is transited to the temperature rise mode and the state of the intake-exhaust control changes. Further, if the traveling speed of the vehicle is changing, the influence on the drivability is considered to be small even if the temperature control unit 13 is transited to the temperature rise mode. Further, if the vehicle is stopped, the influence on the drivability is considered to be small even if the temperature control unit 13 is transited to the temperature rise mode.

The traveling state of the vehicle can be specified by the fuel injection amount. Therefore, the execution control unit 14 transits the temperature control unit 13 to the temperature rise mode when both the first condition and the second condition are satisfied, so that it is possible to suppress the influence on the drivability by causing the transition to the temperature rise mode. For example, by comparing the fuel injection amount with a predetermined threshold and determining whether the second condition is satisfied, the execution control unit 14 transits the temperature control unit 13 to the temperature rise mode when the influence of the fluctuation of the driving torque on the drivability is sufficiently small.

The execution control unit 14 determines whether or not the second condition is satisfied based on a plurality of determination criteria. For example, the execution control unit 14 transits the temperature control unit 13 to the temperature rise mode on condition that the fuel injection amount is equal to or greater than a first threshold determined based on the magnitude of the fluctuation of the driving torque. At this time, the execution control unit 14 may transit the temperature control unit 13 to the temperature rise mode on condition that the fuel injection amount is within a predetermined range equal to or greater than the first threshold.

Further, the execution control unit 14 transits the temperature control unit 13 to the temperature rise mode on condition that a change amount of the fuel injection amount within a predetermined time is equal to or greater than a second threshold determined based on the magnitude of the fluctuation of the driving torque. The execution control unit 14 may determine the second threshold based on the amount of fluctuation of the driving torque corresponding to the temperature of the catalyst.

Further, the execution control unit 14 transits the temperature control unit 13 to the temperature rise mode on condition that the fuel injection amount indicates that the vehicle is in a stop state. For example, the execution control unit 14 determines that the vehicle is in the stop state on condition that the fuel injection amount is less than the predetermined threshold at which a small load is applied to the vehicle.

The execution control unit 14 may determine each of the above thresholds based on a rotational speed of the engine. When the load applied to the vehicle is the same, the larger the rotational speed of the engine, the larger the fuel injection amount. Therefore, the execution control unit 14 increases the threshold when the rotational speed of the engine is large. In this way, the execution control unit 14 can transit the temperature control unit 13 to the temperature rise mode at an appropriate timing according to the magnitude of the load applied to the vehicle.

Operation Flowchart of Exhaust Purification System 1

Figure 2:
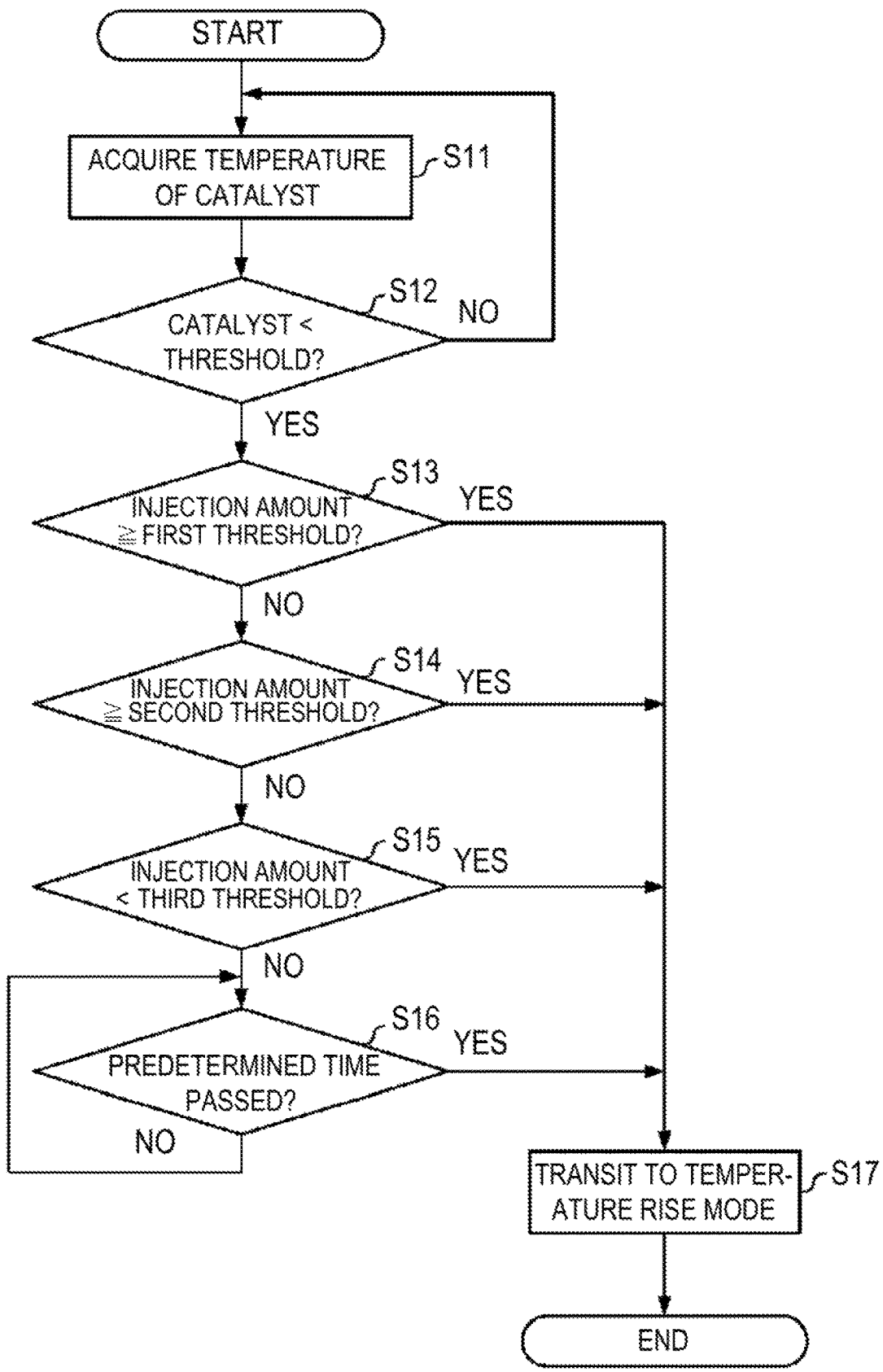
FIG. 2 is an operation flowchart of the exhaust purification system.

FIG. 2 is an operation flowchart of the exhaust purification system 1.

First, the fuel injection amount acquisition unit 11 acquires the temperature of the catalyst (S11). Subsequently, the execution control unit 14 determines whether or not the temperature of the catalyst acquired in step S11 is lower than the predetermined threshold (S12). When it is determined that the temperature of the catalyst is equal to or higher than the predetermined threshold (NO in S12), the execution control unit 14 does not need to transit the execution control unit 13 to the temperature rise mode, and thus the process returns to step S11.

When it is determined in step S12 that the temperature of the catalyst is lower than the predetermined threshold (YES in S12), the execution control unit 14 executes steps S13 to S15 to determine whether or not the influence on the drivability is sufficiently small when the temperature control unit 13 is transited to the temperature rise mode.

In step S13, the execution control unit 14 determines whether or not the fuel injection amount is equal to or greater than the first threshold. When it is determined that the fuel injection amount is equal to or greater than the first threshold and a certain load is applied to the engine (YES in S13), the execution control unit 14 transits the temperature control unit 13 to the temperature rise mode (S17).

In step S14 the execution control unit 14 determines whether or not the change amount in fuel injection is equal to or greater than the second threshold. When it is determined that the change amount in fuel injection is equal to or greater than the second threshold and a shift is executed (YES in S14), the execution control unit 14 transits the temperature control unit 13 to the temperature rise mode (S17).

In step S15, the execution control unit 14 determines whether or not the fuel injection amount is less than a third threshold. When it is determined that the fuel injection amount is less than the third threshold and the vehicle is stopped (YES in S15), the execution control unit 14 transits the temperature control unit 13 to the temperature rise mode (S17).

Even when all the conditions from step S13 to step S15 are not satisfied, the execution control unit 14 transits the temperature control unit 13 to the temperature rise mode (S17) when a predetermined time passes (YES in S16). At this time, the execution control unit 14 instructs the temperature control unit 13 to gradually change the temperature. In this way, it is possible to suppress the exhaust from being sufficiently cleaned by not transiting to the temperature rise mode for a long time when all the conditions of steps S13 to S15 are not satisfied.

Effects of Exhaust Purification System 1 of Present Embodiment

As described above, the execution control unit 14 of the present embodiment causes the temperature control unit 13 to increase the temperature of the catalyst when the temperature of the catalyst is lower than the predetermined threshold and the fuel injection amount satisfies a predetermined condition defined based on the fluctuation of the driving torque of the vehicle generated by the temperature control unit 13 controlling the temperature of the catalyst. In this way, it is possible to suppress the influence of fluctuation of the driving torque caused by the influence of the intake/exhaust control and the after injection executed in the temperature rise mode of the catalyst on the drivability.

Further, since the execution control unit 14 determines whether or not to cause the temperature control unit 13 to increase the temperature of the catalyst by comparing the fuel injection amount with the threshold determined based on the rotational speed of the engine, it is possible to control whether or not to transit the temperature control unit 13 to the temperature rise mode by using an appropriate threshold according to a condition of a road.

Further, the execution control unit 14 causes the temperature control unit 13 to increase the temperature of the catalyst on condition that the fuel injection amount is equal to or greater than the first threshold determined based on the magnitude of the fluctuation of the driving torque. In this way, the execution control unit 14 can transit the temperature control unit 13 to the temperature rise mode at a timing at which a certain load is applied to the engine and the driver is less likely to notice the fluctuation of the driving torque.

Further, the execution control unit 14 can cause the temperature control unit 13 to increase the temperature of the catalyst on condition that the fuel injection amount indicates a state where the vehicle is stopped or the change amount in the fuel injection amount within the predetermined time is equal to or greater than the second threshold determined based on the magnitude of the fluctuation of the driving torque. In this way, the execution control unit 14 can transit the temperature control unit 13 to the temperature rise mode at a timing at which it is difficult for the fluctuation of the driving torque to influence the drivability, such as during the stop or the shift of the vehicle.

Although this disclosure has been described using embodiments, the technical scope of this disclosure is not limited to the scope described in the above embodiment. It is apparent to those skilled in the art that various modifications or improvements may be added to the above embodiment. It is also apparent from description of the scope of claims that an embodiment with such alterations or improvements can be included in the technical scope of this disclosure.

The present application is based on Japanese Patent Application No. 2016-043220 filed on Mar. 7, 2016, contents of which are incorporated herein as reference.

INDUSTRIAL APPLICABILITY

According to the exhaust purification system and the control method of the exhaust purification system of this disclosure, it is possible to suppress the decrease in the drivability during transition of the exhaust purification system to the temperature rise mode.

DESCRIPTION OF REFERENCE NUMERALS

1 exhaust purification system
11 fuel injection amount acquisition unit
12 temperature acquisition unit
13 temperature control unit
14 execution control unit

The invention claimed is:

1. An exhaust purification system comprising:
a central processing unit (CPU) that acquires a fuel injection amount of a vehicle,
acquires a temperature of a catalyst for reducing and purifying nitrogen compounds in exhaust,
controls the temperature of the catalyst, and
causes an increase in the temperature of the catalyst when the temperature of the catalyst is lower than a predetermined threshold and the fuel injection amount satisfies a predetermined condition, and
wherein the CPU determines whether or not to cause the increase in the temperature of the catalyst by comparing the fuel injection amount with a threshold determined based on a rotational speed of an engine.

2. The exhaust purification system according to claim 1, wherein the CPU causes the increase in the temperature of the catalyst on condition that the fuel injection amount indicates that the vehicle is stopped.

3. An exhaust purification system comprising:
a central processing unit (CPU) that acquires a fuel injection amount of a vehicle,
acquires a temperature of a catalyst for reducing and purifying nitrogen compounds in exhaust,
controls the temperature of the catalyst, and
causes an increase the temperature of the catalyst when the temperature of the catalyst is lower than a predetermined threshold
on condition that the fuel injection amount is equal to or greater than a first threshold determined based on a magnitude of fluctuation of a driving torque of the vehicle according to an increment of a temperature of the catalyst.

4. An exhaust purification system comprising:
a central processing unit (CPU) that acquires a fuel injection amount of a vehicle,
acquires a temperature of a catalyst for reducing and purifying nitrogen compounds in exhaust,
controls the temperature of the catalyst, and
causes an increase in the temperature of the catalyst when the temperature of the catalyst is lower than a predetermined threshold on condition that a change amount of the fuel injection amount within a predetermined time is equal to or greater than a second threshold determined based on a magnitude of fluctuation of the driving torque of the vehicle according to an increment of the temperature of the catalyst.

* * * * *